United States Patent
McLaren et al.

(10) Patent No.: US 7,788,025 B2
(45) Date of Patent: Aug. 31, 2010

(54) NAVIGATION SYSTEM

(75) Inventors: Timothy V. McLaren, Marion, IA (US); Wilmer A. Mickelson, Cedar Rapids, IA (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 530 days.

(21) Appl. No.: 11/348,627

(22) Filed: Feb. 7, 2006

(65) Prior Publication Data

US 2006/0271295 A1 Nov. 30, 2006

Related U.S. Application Data

(60) Provisional application No. 60/650,686, filed on Feb. 7, 2005.

(51) Int. Cl.
*G01C 21/12* (2006.01)
*G01S 5/02* (2010.01)

(52) U.S. Cl. .......... 701/200; 701/213; 701/216; 342/357.14

(58) Field of Classification Search .......... 701/200, 701/213, 216, 217; 342/357.06, 357.12, 342/357.14
See application file for complete search history.

(56) References Cited

U.S. PATENT DOCUMENTS

| | | | |
|---|---|---|---|
| 4,903,212 A * | 2/1990 | Yokouchi et al. | 701/216 |
| 4,949,268 A * | 8/1990 | Nishikawa et al. | 701/216 |
| 5,293,318 A * | 3/1994 | Fukushima | 701/216 |
| 5,297,028 A | 3/1994 | Ishikawa | |
| 5,311,195 A * | 5/1994 | Mathis et al. | 342/357.14 |
| 5,416,712 A * | 5/1995 | Geier et al. | 701/216 |
| 6,205,401 B1 | 3/2001 | Pickhard | |
| 6,401,036 B1 | 6/2002 | Geier | |
| 6,453,238 B1 | 9/2002 | Brodie | |
| 6,545,638 B2 | 4/2003 | Sladen | |
| 6,577,952 B2 | 6/2003 | Geier | |
| 6,801,855 B1 * | 10/2004 | Walters et al. | 701/216 |
| 6,850,844 B1 | 2/2005 | Walters et al. | |
| 2002/0021245 A1 * | 2/2002 | Lin et al. | 342/357.14 |
| 2002/0105460 A1 | 8/2002 | Sladen | |
| 2004/0073364 A1 | 4/2004 | Jung et al. | |

FOREIGN PATENT DOCUMENTS

| | | |
|---|---|---|
| EP | 1006367 | 6/2000 |
| EP | 1143264 | 10/2001 |
| EP | 1221586 | 7/2002 |

OTHER PUBLICATIONS

International Search Report and Written Opinion Dated Feb. 27, 2007.
International Preliminary Report on Patentability and Written Opinion Dated Aug. 16, 2007.

* cited by examiner

*Primary Examiner*—Tan Q Nguyen

(57) ABSTRACT

A navigation system includes a first navigation module having a first operational state wherein the first navigation module does not estimate a current location and a second operational state wherein the first navigation module estimates the current location. A second navigation module performs dead reckoning in response to the first operational state of the first navigation module.

13 Claims, 2 Drawing Sheets

NAVIGATION SYSTEM

RELATED APPLICATIONS

This application claims priority to U.S. Provisional Application No. 60/650,686, which was filed Feb. 7, 2005.

BACKGROUND

This invention relates to navigation systems and, more particularly, to a navigation system and method for improving reliability of estimating a navigation system solution.

Navigation devices are widely known and used in vehicles, hand held devices, and other devices to indicate location and for route guidance. Often, such devices include a screen for displaying a map and indicating a current location on the map. Typically, a conventional navigation system utilizes dead-reckoning to determine the current location. Although methods of dead-reckoning vary, dead-reckoning may entail, for example, estimating the current location based upon a previously estimated location, speed, direction, and time. Typically, the current location is then matched with a database map to determine the current location with respect to roadways or other landmarks. This distance off the roadway and the heading of the roadway may be used as an additional piece of data in determining the current location and heading.

Conventional navigation devices are not always able to reliably estimate the current location. For example, such devices usually require some time to start-up after being turned on. During start-up, the navigation device cannot perform any navigation computations because it is occupied loading the operating system, transferring files, initializing hardware, etc. Furthermore, GPS location and heading may be unavailable even after the start-up is completed. As a result, when the navigation device begins dead-reckoning, the estimation of a new current location and heading may be unreliable.

Accordingly, there is a need for a navigation device that is capable of performing dead-reckoning functions while the navigation device is occupied with other activities such as boot-up.

SUMMARY

A navigation system according to the present invention includes a first navigation module having a first operational state wherein the first navigation module does not estimate current location and heading and a second operational state wherein the first navigation module does estimate the current location and heading. A second navigation module performs dead reckoning in response to the first operational state of the first navigation module.

One exemplary method of navigation according to the present invention includes performing dead reckoning from a previous location to a current location with a second navigation module during an occupied period of a first navigation module. After the occupied period ends, the second navigation module communicates the dead reckoned data to the first navigation module, which estimates a new current location and heading based upon a previously stored location and heading and the dead reckoned data.

Another exemplary method of navigation according to the present invention includes determining a GPS reception quality parameter and selecting whether to eliminate or consider a map roadway segment of a map database as a candidate map roadway segment for map matching measurements in response to the GPS reception quality parameter. The map matching measurements are processed through a filter to update the navigation solution.

The above examples are not intended to be limiting. Additional examples are described below.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION

Figure 1:
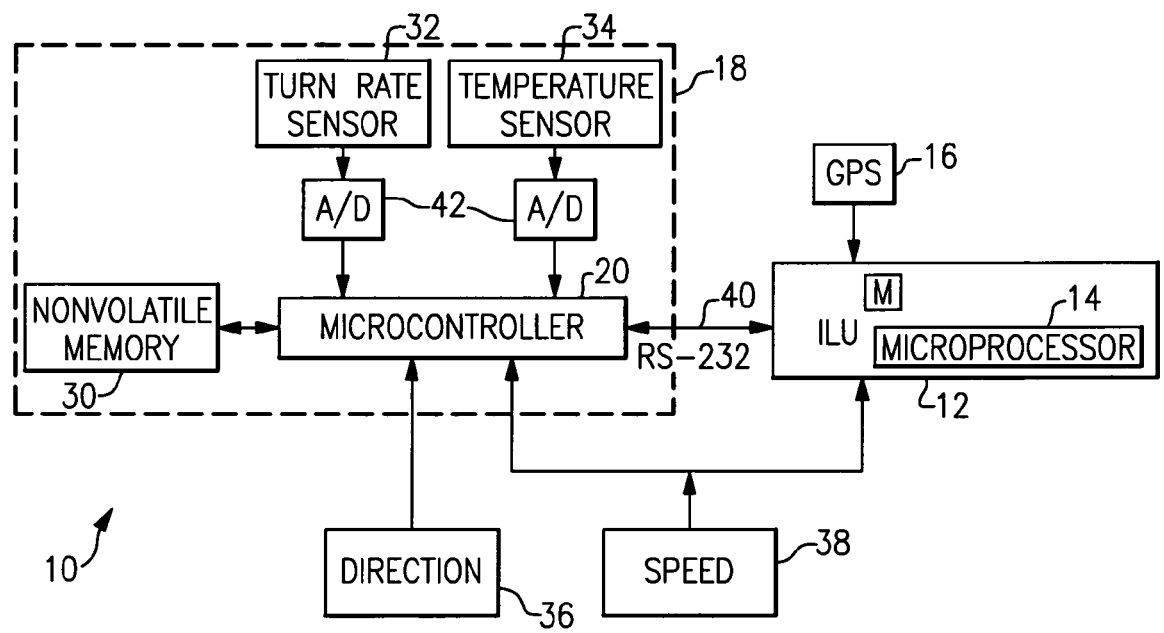
FIG. 1 shows selected portions of an example navigation system.

FIG. 1 illustrates selected portions of an example navigation system 10 for use in a vehicle to indicate location. In this example, the navigation system 10 includes a first module 12, such as an integrated logic unit (ILU), having a microprocessor 14 that performs navigational tasks. In one example, the navigational tasks include dead reckoning, global positioning system (GPS) location, and map matching.

The first module 12 is in communication with a GPS module 16 that receives satellite-based GPS signals. The microprocessor 14 of the first module 12 utilizes the GPS data to calculate a GPS position solution in a known manner and includes a non-volatile memory M for storing data or other information.

In the illustrated example, a second module 18, such as a turn rate sensor module, cooperates with the first module 12 to perform the dead reckoning when the first module 12 is occupied with other activities, such as booting up. In this example, the second module 18 includes a microcontroller 20 which interfaces with a variety of received signals to perform the dead reckoning while the first module 12 is occupied. In this example, the microcontroller 20 communicates with a non-volatile memory 30, a turn rate sensor 32 and a temperature sensor 34. In one example, the turn rate sensor 32 includes one or more gyros that operate in a known manner to detect turning. The microcontroller 20 also receives signals that indicate direction 36 and speed 38. In one example, the direction 36 indicates a direction of a vehicle, such as reverse, and the speed 38 indicates a vehicle speed by using odometer pulses.

In the illustrated example, the microcontroller 20 of the second module 18 communicates with the first module 12 over a line 40, such as an RS-232 line.

In the illustrated example, converters 42 convert analog electrical signals from the turn rate sensor 32 and temperature sensor 34 into digital signals received by the microcontroller 20.

In one operational example, the navigation system 10 is switched from an OFF condition to an ON condition. In response to the ON condition, the microprocessor 14 of the first module 12 starts-up. The start-up process of the microprocessor 14 may take some time. In one example, the start-up takes between only a few seconds and several minutes, however, the time may vary depending on the particular start-up process. During the start-up, the microprocessor 14 is, for example, unable to perform tasks necessary for reliable navigation and unable to receive data from the GPS module 16. During this time, if the navigation system 10 moves, estimation of current position and heading by the microprocessor 14 based upon a last known location and heading may be unreliable.

In one example, upon being switched to the ON condition, software of the first module 12 performs a number of start-up steps which cause a delay before the first module 12 is able to perform reliable navigation. The steps, for example, include normal operating system boot-up, checking the file consistency of a flash drive, transfer of files over a wireless LAN, requesting initialization data from the microcontroller 20, reading and initializing latitude, longitude, and heading data from the microcontroller 20, reading and storing gyro calibration data, and computing calibration curve fit data. It is to be understood that these example initialization steps may entail more detailed steps and calculations, and may vary depending on the particular software.

The second module 18 is fully operational a relatively short time after the navigation system 10 is turned on. In one example, the second module is operational as soon as a vehicle is turned on (e.g., if the navigation system is in a vehicle). In a further example, the second module 18 does not perform a series of initialization steps as does the first module 12. While the first module 12 starts-up, the second module 18 performs dead reckoning based upon turn rate sensor and speed 38 until the first module 12 completes the start-up process and is able to estimate location using dead reckoning or other methods of location determination.

The second module 18 performs the dead reckoning based upon previous displacement and heading change data stored in the non-volatile memory 30. In one example, the microcontroller 20 of the second module 18 utilizes the speed signal 38, the direction signal 36, and a turn rate signal from the turn rate sensor 32 to determine a navigation system 10 relative position and heading. The relative position and heading represent heading and position changes since the last navigation by the first module. Positional changes are maintained in units of odometer counts with no need for odometer scale factor. Relative heading is computed as the heading change since the last navigation by the first module. Alternatively, data representing a last known position and odometer scale factor may be received from the first module 12 and stored in the non-volatile memory 30. In this case the second module performs dead reckoning to maintain an absolute position and heading.

In the following example equations, relative position and heading are computed. The X-axis is north and the Y-axis is east for the case that the initial heading is zero. More generally, the X-axis corresponds to the vehicle heading at the time of the last ILU power down. In one example, the navigation system 10 position and heading are determined as follows:

$$DR\_Hdg^n = DR\_Hdg^{n-1} + (0.5*(Hdg\_Rate^{n-1} + Hdg\_Rate^n) - DRFT)*DT2 \text{ where } DT2 = \text{time iteration interval.}$$

Limit $DR\_Hdg^n$ such that $-\pi < DR\_Hdg^n < \pi$ by adding or subtracting $2\pi$ as necessary.

Velocity is computed as $$V\_X^n = SPD^n * \cos(DR\_Hdg^n)$$

$$V\_Y^n = SPD^n * \sin(DR\_Hdg^n)$$

Position increments are computed as $$\Delta R\_X^n = \Delta R\_X^{n-1} + 0.5*(V\_X^{n-1} + V\_X^n)$$

$$\Delta R\_Y^n = \Delta R\_Y^{n-1} + 0.5*(V\_Y^{n-1} + V\_Y^n)$$

In one example, the second module 18 outputs the navigation system 10 position and heading as a dead reckoning variable X, a dead reckoning variable Y, and a dead reckoning variable Hdg, which indicate respectively, an along track displacement, a cross track displacement, and an angle representing the amount of heading change.

The microcontroller 20 calculates the navigation system 10 along track displacement, cross track displacement, and heading change that has accumulated since the first module ceased operation in its second state. If power is switched to the OFF state prior to the microprocessor 14 of the first module 12 requesting this accumulated displacement and heading change data from the microcontroller 20, the microcontroller 20 stores the accumulated displacement and heading change data in the non-volatile memory 30. The microcontroller 20 periodically calculates a new navigation system 10 along track displacement, cross track displacement, and heading change based upon signals received from the turn rate sensor 32, and the navigation system 10 direction 36 and speed 38. Once the microprocessor 14 of the first module 12 completes the start-up process, the first module 12 requests the navigation system 10 accumulated along track displacement, cross track displacement, and heading change data from the second module 18. The second module 18 replies with the requested data.

In one example, the first module 12 commands the second module 18 to cease any further performance of the dead reckoning. Optionally, the first module 12 also commands the second module 18 to begin other operations, such as sensing a turn rate of a vehicle and clearing the stored position and heading data from the non-volatile memory 30. Upon receiving the navigation system 10 position and heading data, the first module 12 utilizes the accumulated position and heading data along with position and heading stored at the last powerdown as a starting point for the dead reckoning process. Thus, if the navigation system 10 moves during start-up of the microprocessor 14 of the first module 12, the second module 18 tracks the movement such that when the first module 12 becomes capable of dead reckoning, the estimation of the current location is more reliable.

Alternatively, the second module 18 uses position and heading data stored from the first module 12 before shutdown to determine the current location.

Figure 2:
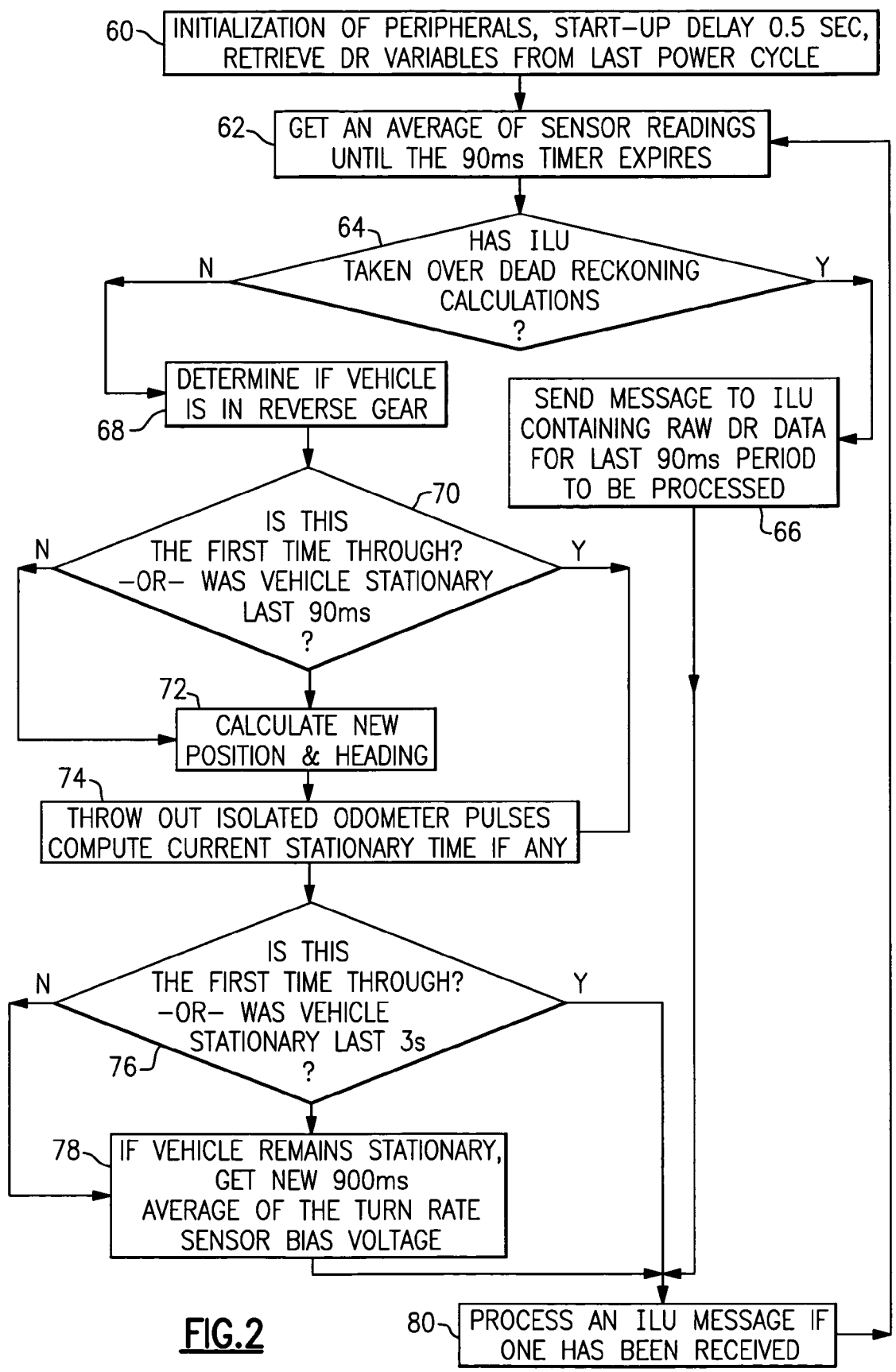
FIG. 2 shows an example flow chart illustrating one example method of dead reckoning using the navigation system of FIG. 1.

FIG. 2 illustrates a flow chart showing an example implementation of the microcontroller 20 of the second module 18 performing dead reckoning. At an initialization step 60, the navigation system 10 is switched from an OFF state to an ON state. Once it is switched ON, the microcontroller 20 initializes by setting dead reckoning variables such as DR X, DR Y, and DR Hdg from values stored in the non-volatile memory 30. If the microcontroller 20 has been commanded by the first module 12 to cease dead reckoning prior to being switched to an OFF state it will store zero for the values of DR X, DR Y, and DR Hdg in non-volatile memory 30 when it is switched to an OFF state. If the microcontroller 20 has not been commanded by the first module 12 to cease dead reckoning prior to being switched to an OFF state it will store the accumulated values of DR X, DR Y, and DR Hdg in non-volatile memory 30 when it is switched to an OFF state.

After initializing the dead reckoning variables, the microcontroller 20 waits for a pre-determined amount of time before performing any dead reckoning calculations. In one example, the microcontroller 20 waits about 0.5 seconds from the powering ON of the navigation system 10 before performing dead reckoning based upon entering of the signals received from the converters 42. This provides the benefit of minimizing erroneous calculations caused by power transients from the converters 42.

After the initial pre-determined time period, the microcontroller 20 receives a first temperature reading from the temperature sensor 34. In one example, this first temperature reading is stored as variable Temp zero and is used to determine gyro temperature compensation coefficients. In one example, the microcontroller 20 utilizes Temp zero to determine the gyro temperature compensation coefficients as follows:

```
IF (Temp0 < -25) THEN
    i = 1
ELSE IF (Temp > 65) THEN
    i = 20
ELSE
    i = INT(( Temp + 30. ) / 5.0 )
ENDIF
    Temp1 = Temp_i
    Gyro_DRFT1 = Gyro_DRFT_Temp_i
    Gyro_DRFT2 = Gyro_DRFT_Temp_{i+1}
    Gyro_SF1 = Gyro_SF_Temp_i
    Gyro_SF2 = Gyro_SF_Temp_{i+1}
    GradDRFT1 = GradDRFT_Temp_i
    GradDRFT2 = GradDRFT_Temp_{i+1}
    where Temp_i, Gyro_DRFT_Temp_i, Gyro_DRFT_Temp_{i+1},
    Gyro_SF_Temp_i, Gyro_SF_Temp_{i+1}, GradDRFT_Temp_i
    and GradDRFT_Temp_{i+1} are from Table 1 (below).
```

At step 62, the microcontroller 20 receives signals from the turn rate sensor 32, temperature sensor 34, and the speed 38 signal. In one example, the microcontroller 20 computes an average of each of the signals over a selected time period, such as 90 msec.

At step 64, the microcontroller 20 determines whether the first module 12 has requested the navigation system 10 position and heading data. If the microcontroller 20 has received the request from the first module 12, the microcontroller 20 sends a message to the first module 12 containing the averaged turn rate and temperature data for the previous time period, such as 90 msec, and optionally whether the vehicle is in a forward or reverse gear.

If the microcontroller 20 has not received the request from the first module 12, the microcontroller 20 proceeds to the step at 68, which includes determining whether a vehicle is in a reverse gear. This entails analyzing the direction 36 signal. In one example, the direction 36 signal is binary to indicate whether or not a vehicle is in a reverse gear.

At step 70, the microcontroller 20 makes a determination whether this is the first time through the cycle or whether the navigation system 10 has been stationary for the previous time period, such as 90 msec. If this is not the first time through the iteration or if the vehicle has not been stationary during the time period, the microcontroller 20 proceeds to the step at 72 and calculates a new relative position and heading.

In the step at 70, if it is the first time through the iteration or the vehicle has been stationary for the time period, the microcontroller 20 proceeds to the step at 74 and computes the current stationary time. In computing the current stationary time, the microcontroller discards single isolated speed 38 pulses as noise. In one example, after a predetermined amount of stationary time, such as 3 seconds in step 76, the microcontroller 20 calibrates the bias of the turn rate sensor 32 at step 78. In one calibration example, the microcontroller 20 calibrates the gyro by either continuously or periodically updating a gyro drift value of the gyro until there is a speed 38 signal. In one example, the gyro drift value is updated about every 900 msec. In another example, if the microcontroller 20 receives a speed 38 signal during a 900 msec interval, the last complete 900 msec average is used for the gyro drift value.

In one example, the temperature sensor 34 and the turn rate sensor 32 are mounted on separate integrated chips and the gyro drift is dependent upon both temperature and temperature gradients (the rate of change of temperature). At step 72, modeling (predicting) drift based upon both temperature and temperature gradient measurements provides a desirable fit to measured test data. In another example, the temperature sensor 34 and the turn rate sensor 32 are mounted on the same integrated chip, wherein the gyro drift is less dependent on temperature gradient and therefore is not used in the drift calculation. Modeling drift based upon both temperature and temperature gradient is calculated as:

$$\text{Gyro}DRFT\_\text{Temp} = F_1(\text{Temp}) + F_2(\text{Temp}) * \text{TempGrad}$$

where $F_1(\text{Temp})$ is a temperature dependent drift (without temperature gradients) calculated from temperature and calibration data from column 4 of Table 1.

$F_2(\text{Temp})*\text{TempGrad}$ is the temperature gradient induced drift. The value $F_2(\text{Temp})$ is determined from data stored in column 3 of Table 1 during factory calibration and stored in the DR Sensor Module. TempGrad is computed from temperature rate of change filtered through a second order low pass filter.

In the illustrated example, the second module 18 has been loaded with factory calibration of gyro data consisting of drift, temperature gradient induced drift, and gyro scale factor over the range from -30 deg. C to 70 degrees C. Values are stored during factory calibration for each 5 degree C temperature range. The factory calibration data is gradually replaced in the first module 12 by calibration points determined by a navigation Kalman filter. A least squares curve fit is used to calculate the stable temperature drift compensation from the stored calibration data.

Table 1 below shows the gyro calibration data stored in the second module 18. This data is loaded into the DR Sensor Module during factory calibration. Thereafter, data in column 4 and column 5 is updated with new calibration data determined by the first module 12 during normal system operation. The new data is calibrated from error estimations made by the Kalman filter and transmitted to the DR Sensor Module (second module 18).

GyroDRFT_Temp and GyrSF_Temp calibration data are received from the first module 12 as new data is determined. It should be noted that only a portion of Table 1 will be updated at any one time. Specifically, revised data for GyroDRFT_Temp and GyrSF_Temp at three consecutive temperatures in Table 1 will be received during an update interval (typically once per hour). These replace the corresponding temperature data in Table 1.

TABLE 1

| Col. 1 Index i | Col. 2 Temp._i (Deg. C.) | Col. 3 GradDRFT_Temp_i (Rad/Sec)/ (Deg C./Min) | Col. 4 GyroDRFT_Temp (Rad/Sec) | Col. 5 GyroSF_Temp (Unitless) |
|---|---|---|---|---|
| 1 | -30 | GradDRFT_Temp_1 | GyroDRFT_Temp_1 | GyroSF_Temp_1 |

TABLE 1-continued

| Col. 1 Index i | Col. 2 Temp.$_i$ (Deg. C.) | Col. 3 GradDRFT_Temp$_i$ (Rad/Sec)/ (Deg C./Min) | Col. 4 GyroDRFT_Temp (Rad/Sec) | Col. 5 GyroSF_Temp (Unitless) |
|---|---|---|---|---|
| 2 | −25 | GradDRFT_Temp$_2$ | GyroDRFT_Temp$_2$ | GyroSF_Temp$_2$ |
| 3 | −20 | GradDRFT_Temp$_3$ | GyroDRFT_Temp$_3$ | GyroSF_Temp$_3$ |
| . | . | — | . | . |
| . | . |  | . | . |
| . | . |  | . | . |
| 19 | 60 |  |  |  |
| 20 | 65 |  |  |  |
| 21 | 70 |  |  |  |

In addition, the factory calibration of gyro drift sensitivity to temperature gradient is stored for each 5° C. interval. Linear interpolation is used to calculate the temperature gradient drift compensation. Kalman filter calibration points do not replace these values.

At 80, the microcontroller 20 checks to determine whether a request signal has been received from the first module 12. If a request signal has been received, the microcontroller 20 sends the navigation system 10 position and heading data and gyro drift value to the first module 12. In one example, the microcontroller 20 continues to perform the dead reckoning by returning to the step 62 until a command to stop is received from the first module 12 at step 64.

Once the first module 12 completes start-up, and receives the navigation system 10 position, heading, and gyro drift value from the second module 18, the first module 12 takes over the navigation from the second module 18. In one example, the navigation performed by the first module 12 includes using dead reckoning and map matching to determine a current location.

In one example, the quality of the GPS signals is determined from a signal-to-noise ratio of at least one GPS signal. A relatively low signal-to-noise ratio indicates that the navigation system 10 is in a tunnel or other location with poor GPS reception. A relatively high signal-to-noise ratio indicates that the navigation system 10 is in an area with relatively good GPS reception. In one example, a signal-to-noise ratio close to zero indicates poor GPS reception.

Some areas known to have poor GPS reception, such as tunnels or other areas where it is difficult for the GPS module 16 of the navigation system 10 to receive the GPS signals, are known or can be predicted. Such areas are then flagged within the database map to indicate poor GPS reception and therefore correspond, for example, to a tunnel, or other poor GPS reception area.

In one example map matching process, the signal-to-noise ratio of one or more GPS signals is used to determine whether the navigation system 10 is in a tunnel or not. If the signal-to-noise ratio is close to zero while the navigation system 10 is in a tunnel, the first module 12 eliminates portions of the database map such as roadway segments that are not in tunnels, as candidates for map matching the current location on the database map. If the signal-to-noise ratio of one or more of the GPS signals is above a design threshold, the first module 12 considers only portions of the database map, such as roadway segments that have not been flagged as tunnel sections, as candidate sections for map matching the current location on the database map.

In one example, GPS receiver signal characteristics are examined for an indication that the navigation system 10 is in a tunnel or not in a tunnel. Each segment of the database map is flagged to indicate if it represents an above ground segment, a tunnel segment, or a transition segment. A transition segment is a segment near the entrance or exit of a tunnel or any location where the tunnel/non-tunnel indication would be unreliable. The first module 12 utilizes the GPS receiver derived tunnel/non-tunnel indication to eliminate certain database sections as potential map matching candidates. A tunnel indication allows map matching using only map segments flagged as tunnel or transition segments. A non-tunnel indication allows map matching using only map segments flagged as above ground or transition segments.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A navigation system comprising:
   a first navigation module having a first operational state wherein the first navigation module does not estimate the current location and a second operational state wherein the first navigation module estimates a current location; and
   a second navigation module that performs dead-reckoning in response to the first operational state of the first navigation module, wherein the first navigation module and the second navigation module are each configured to perform independent dead-reckoning calculations.

2. The system as recited in claim 1, wherein the first operational state is during the start-up period of the first navigation module and the second operational state is after the start-up period of the first navigation module.

3. The system as recited in claim 1, wherein the first navigation module does not receive global positioning (GPS) signals in the first operational state and receives the GPS signals in the second operational state.

4. The system as recited in claim 1, wherein the first navigation module estimates the current location in response to received global positioning system (GPS) signals and the second navigation module performs the dead-reckoning in response to an absence of the received GPS signals.

5. The system as recited in claim 1, wherein the first navigation module includes a first microcontroller that estimates a current location in response to the second operational state and the second navigation module includes a second microcontroller different than the first microcontroller that performs the dead-reckoning in response to the first operational state.

6. The system as recited in claim 5, wherein the second navigation module includes a non-volatile memory in communication with the second microcontroller.

7. The system as recited in claim 6, wherein the second navigation module includes a turn rate sensor in communication with the second microcontroller.

8. The system as recited in claim 7, wherein the second navigation module includes a temperature sensor in communication with the second microcontroller.

9. The system as recited in claim 8, wherein the turn rate sensor and the temperature sensor are mounted on a common integrated circuit board.

10. The system as recited in claim 5, wherein each of the first microcontroller and the second microcontroller receive an odometer signal.

11. The system as recited in claim 5, wherein at least the second microcontroller receives a signal from a vehicle reverse switch for performing the dead-reckoning.

12. The system as recited in claim 5, wherein the first navigation module includes a GPS for estimating a current location in response to the second operational state.

13. A navigation system comprising:

a first navigation module having a first operational state wherein the first navigation module does not estimate the current location and a second operational state wherein the first navigation module estimates a current location; and a second navigation module that performs dead-reckoning in response to the first operational state of the first navigation module, wherein the first navigation module is configured to instruct the second navigation module to perform operations other than dead-reckoning.

* * * * *